(12) United States Patent
Martinez

(10) Patent No.: US 12,551,965 B2
(45) Date of Patent: Feb. 17, 2026

(54) TOOL FOR HOLDING A TUNGSTEN ELECTRODE DURING SHARPENING

(71) Applicant: Edwin Alonzo Martinez, Pasadena, TX (US)

(72) Inventor: Edwin Alonzo Martinez, Pasadena, TX (US)

( * ) Notice: Subject to any disclaimer, the term of this patent is extended or adjusted under 35 U.S.C. 154(b) by 812 days.

(21) Appl. No.: 17/901,198

(22) Filed: Sep. 1, 2022

(65) Prior Publication Data

US 2024/0075548 A1  Mar. 7, 2024

(51) Int. Cl.
*B23K 9/26* (2006.01)
*B24B 19/16* (2006.01)

(52) U.S. Cl.
CPC ............ *B23K 9/26* (2013.01); *B24B 19/16* (2013.01)

(58) Field of Classification Search
CPC . B23K 9/282; B23K 9/26; B23K 3/06; B23K 6/0607; B23D 31/08; B23D 31/101; B24B 19/16; B24B 41/066; B24B 23/005; B23B 31/08; B23B 31/083; B23B 2231/38
See application file for complete search history.

(56) References Cited

U.S. PATENT DOCUMENTS

| | | | | |
|---|---|---|---|---|
| 5,893,685 A | * | 4/1999 | Olson | B25F 5/029 81/439 |
| 5,963,353 A | * | 10/1999 | Shibuya | G02B 26/121 359/198.1 |
| 2014/0371728 A1 | * | 12/2014 | Vaughn | B23B 31/22 606/1 |

* cited by examiner

*Primary Examiner* — Brian W Jennison
(74) *Attorney, Agent, or Firm* — Jeffrey L. Streets

(57) ABSTRACT

A tool includes a handle having a proximal end and a distal end, wherein the handle includes a first cylindrical cavity extending into the handle from an opening in the distal end and having a first cylindrical wall. The tool further includes a radial bearing having an inner race, an outer race, and rolling elements, wherein the outer race is secured to the first cylindrical wall of the first cylindrical cavity. Still further, the tool includes a central shaft having proximal and distal sections, wherein the proximal section is secured to the inner race, and wherein the distal section extends from the first cylindrical cavity and includes external screw threads. The tool additional includes a chuck threadably coupled to the external screw threads, wherein the chuck includes self-centering jaws for selectively gripping a tungsten electrode along an axis of rotation established by the radial bearing.

19 Claims, 4 Drawing Sheets

TOOL FOR HOLDING A TUNGSTEN
ELECTRODE DURING SHARPENING

BACKGROUND

The present disclosure relates to methods and apparatus used to sharpen a tungsten electrode for use in a welding operation.

BACKGROUND OF THE RELATED ART

Gas tungsten arc welding (GTAW) is an arc welding process that uses a non-consumable tungsten electrode to produce the weld. Tungsten is used as an electrode because it has the highest melting temperature among pure metals, such that the tungsten electrode is not consumed during welding. An inert shielding gas, such as argon or helium, is introduced to protect the weld area and the tungsten electrode from oxidation or contamination. The gas tungsten arc welding process may also include use of a filler metal. Common materials that are welded using gas tungsten arc welding include stainless steel, aluminum, magnesium and copper alloys.

BRIEF SUMMARY

Some embodiments provide a tool or apparatus comprising a rigid handle having a proximal end and a distal end, wherein the rigid handle includes a first cylindrical cavity extending into the rigid handle from an opening in the distal end and having a first cylindrical wall. The tool further comprises a radial bearing having an inner race, an outer race, and rolling elements disposed between the inner and outer races, wherein the outer race is secured to the first cylindrical wall of the first cylindrical cavity. Still further, the tool comprises a central shaft having a proximal section and a distal section, wherein the proximal section is secured to the inner race, and wherein the distal section extends from the first cylindrical cavity and includes external screw threads. The tool additional comprises a chuck threadably coupled to the external screw threads included on the distal section of the central shaft, wherein the chuck includes self-centering jaws for selectively gripping a tungsten electrode along an axis of rotation established by the radial bearing.

Some embodiments provide a tool or apparatus comprising a rigid handle having a proximal end and a distal end, wherein the rigid handle includes a first cylindrical cavity extending into the rigid handle from an opening in the distal end and having a first cylindrical wall. The tool further comprises a radial bearing assembly including a plurality of radial bearings, each radial bearing having an inner race, an outer race, and rolling elements disposed between the inner and outer races, wherein the outer race of each of the radial bearings is secured to the first cylindrical wall of the first cylindrical cavity. Still further, the tool comprises a central shaft having a proximal section and a distal section, wherein the proximal section is secured to the inner race, and wherein the distal section extends from the first cylindrical cavity and includes external screw threads. The tool additionally comprises a chuck threadably coupled to the screw threads of the central shaft, wherein the chuck includes self-centering jaws for selectively gripping a tungsten electrode along an axis of rotation established by the radial bearing assembly.

DETAILED DESCRIPTION

Figure 1:
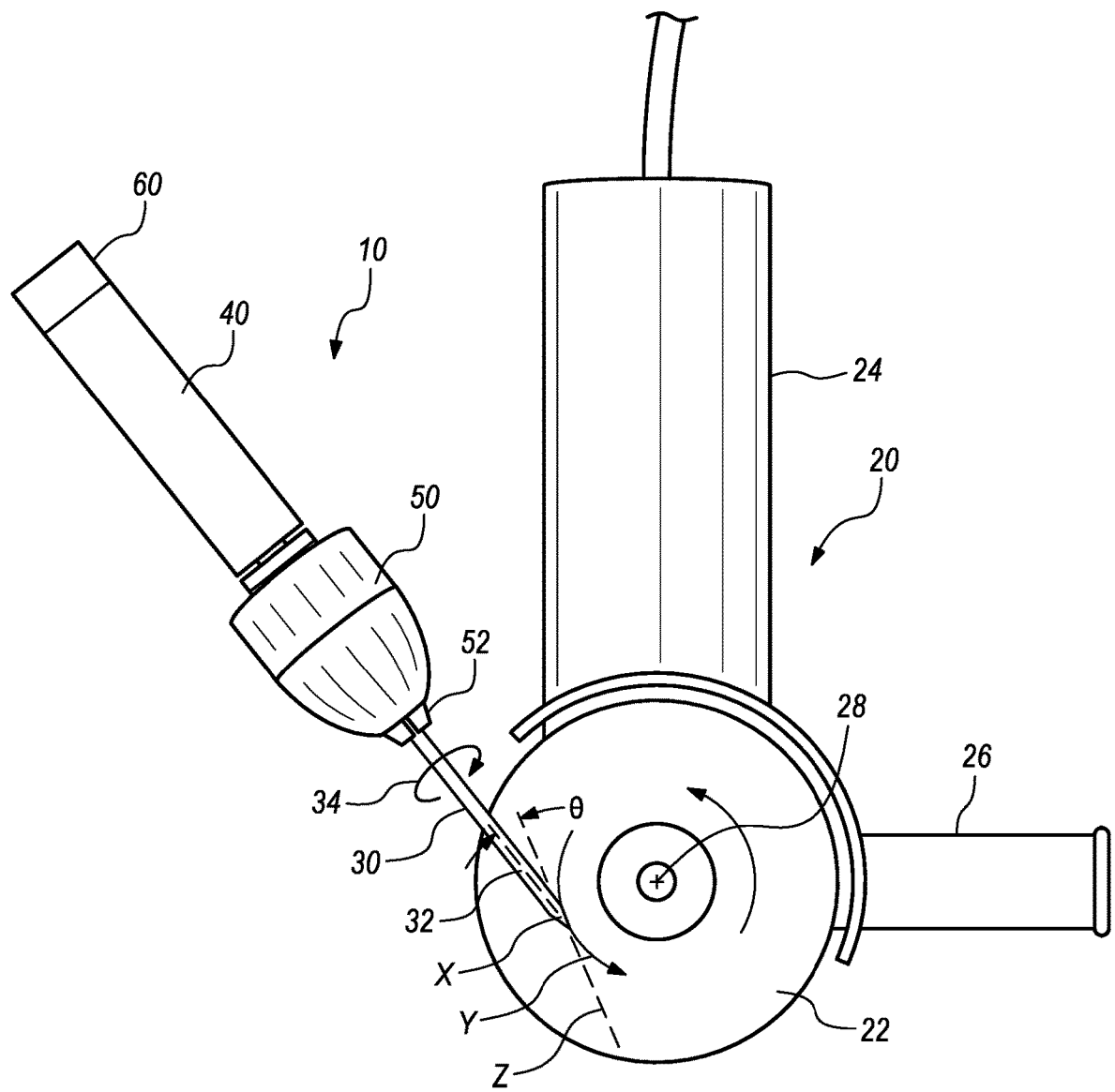
FIG. 1 is a diagram of a tool being used with an angle grinder to sharpen a tungsten electrode for use in welding.

Some embodiments provide a tool or apparatus comprising a rigid handle having a proximal end and a distal end, wherein the rigid handle includes a first cylindrical cavity extending into the rigid handle from an opening in the distal end and having a first cylindrical wall. The tool further comprises a radial bearing having an inner race, an outer race, and rolling elements disposed between the inner and outer races, wherein the outer race is secured to the first cylindrical wall of the first cylindrical cavity. Still further, the tool comprises a central shaft having a proximal section and a distal section, wherein the proximal section is secured to the inner race, and wherein the distal section extends from the first cylindrical cavity and includes external screw threads. The tool additionally comprises a chuck threadably coupled to the external screw threads included on the distal section of the central shaft, wherein the chuck includes self-centering jaws for selectively gripping a tungsten electrode along an axis of rotation established by the radial bearing.

The rigid handle may have any of a wide variety of shapes that are convenient or comfortable to hold in a person's hand, such as a cylindrical shape. For example, a cylindrical handle may have a central axis that is aligned with the axis of rotation. The rigid handle is preferably made with a strong and durable material, such as a metal, for use in a welding environment. In one option, the rigid handle may be made from a single, solid piece of aluminum. Accordingly, features of the rigid handle, such as the first cylindrical cavity, may be machined into the rigid handle or the entire rigid handle may be formed in a casting process.

The first cylindrical cavity may be characterized by the first cylindrical wall that receives the outer race of the radial bearing. Accordingly, the first cylindrical wall may be only slightly larger in diameter than the radial bearing. For example, a thin layer of an adhesive material may be applied between an outer cylindrical surface of the radial bearing and the first cylindrical wall, then allowed to set up and prevent the radial bearing from coming out of the first cylindrical cavity. Notable, the forces applied to the radial bearing during use of the tool do not tend to pull on the radial bearing in a distal direction.

In some embodiments, the first cylindrical cavity may include an inwardly extending cylindrical shoulder that is located a predetermined distance from the distal opening to register the position of a proximal end of the outer race. In addition, the central shaft may include an outwardly extending cylindrical shoulder that is located a predetermined distance from a proximal end of the central shaft to register the position of a distal end of the inner race. Accordingly, the outer race may be positioned against the inwardly extending cylindrical shoulder and the inner race may be positioned against the outwardly extending cylindrical shoulder to prevent the central shaft from contacting any portion of the rigid handle.

In some embodiments, a proximal end of the central shaft may be externally threaded to threadably receive a threaded nut. The threaded nut may be tightened to press against a proximal end of the inner race and thereby secure the distal end of the inner race against the outwardly extending cylindrical shoulder. With the threaded nut secured to the external threads on the proximal end of the central shaft, the central shaft and the radial bearing form an assembly that may be inserted into the first cylindrical cavity as a single member. The first cylindrical cavity should be long enough to avoid contact with the threaded nut, which should turn freely along with the central shaft.

In some embodiments, the radial bearing may be replaced with a plurality of radial bearings positioned in side-by-side contact along the central shaft. The plurality of radial bearings may be retained on the central shaft with the threaded nut. The inner races of the radial bearing may be in frictional engagement with the inner race(s) of any adjacent radial bearing, the outwardly extending shoulder, and/or the threaded nut. Furthermore, the outer races of the radial bearing may be in frictional engagement with the outer race(s) of any adjacent radial bearing and/or the inwardly extending shoulder. However, there should be nothing that prevents the inner races of the radial bearings from turning freely relative to, and within, the outer races.

Embodiments of the central shaft include a distal section with external screw threads for threadably coupling a chuck. Optionally, a distal end of the distal section of the central shaft may include a threaded hole for receiving a screw to further secure the chuck to the central shaft. The chuck itself may have any of wide variety of mechanisms for self-centering jaws for selectively gripping a tungsten electrode along an axis of rotation established by the radial bearing. The chuck could be keyed or keyless.

In some embodiments, the rigid handle may include a second cylindrical cavity extending into the rigid handle from an opening in the proximal end. Preferably the rigid handle will include an internal wall that separates the first cylindrical cavity from the second cylindrical cavity. While the first cylindrical cavity receives and secures the radial bearing and central shaft, the second cylindrical cavity is intended to provide a storage compartment for securing a plurality of extra tungsten electrodes. A cap may be selectively securable to a proximal end of a main handle body in order to close off the second cylindrical cavity and retain the extra tungsten electrodes during use or transport of the tool. For example, the proximal end of the main handle body may include first cylindrical threads and the cap may include second cylindrical threads for threadably coupling to the first cylindrical threads. The cap is preferably made from the same material as the rest of the rigid handle.

In some embodiments, the second cylindrical cavity may be at least 3.5 inches long from the internal wall to the inside of the cap when the cap is secured to the proximal end of the main handle body. Depending upon the diameter of the rigid handle, the second cylindrical cavity may hold from 5 to 10 or more tungsten electrodes having a ⅛-inch diameter.

Some embodiments provide a tool or apparatus comprising a rigid handle having a proximal end and a distal end, wherein the rigid handle includes a first cylindrical cavity extending into the rigid handle from an opening in the distal end and having a first cylindrical wall. The tool further comprises a radial bearing assembly including a plurality of radial bearings, each radial bearing having an inner race, an outer race, and rolling elements disposed between the inner and outer races, wherein the outer race of each of the radial bearings is secured to the first cylindrical wall of the first cylindrical cavity. Still further, the tool comprises a central shaft having a proximal section and a distal section, wherein the proximal section is secured to the inner race, and wherein the distal section extends from the first cylindrical cavity and includes external screw threads. The tool additionally comprises a chuck threadably coupled to the screw threads of the central shaft, wherein the chuck includes self-centering jaws for selectively gripping a tungsten electrode along an axis of rotation established by the radial bearing assembly. The foregoing tool may further include any one or more feature or component described herein in reference to any other embodiment of the tool.

FIG. 1 is a diagram of a tool 10 being used with an angle grinder 20 to sharpen a tungsten electrode 30 for use in a welding operation. The tool 10 includes a main handle body 40, a cap 60 and a chuck 50 that is rotationally mounted to a distal end of the main handle body 40. The tungsten electrode 30 is secured into the jaws 52 of the chuck 50 and a user then used the tool 10 to position the distal end of the tungsten electrode 30 at a slight angle relative to the plane of the angle grinder wheel 22. The angle grinder 20 may be held in place by securing a main handle or motor housing and/or an auxiliary handle 26, while a motor causes the angle grinder wheel 22 to spin about an axis 28 (counter-clockwise in this illustration; see the rotational arrow).

The tungsten electrode 30 may be held at a first angle relative to the plane of the angle grinder wheel 20 into order to establish the point on the distal tip of the tungsten electrode 30. For example, if the angle grinder wheel 20 is spinning in the plane of the page of FIG. 1, then a person would hold the main handle body 40 at a particular angle of X degrees (into the page) in order to grind the tungsten electrode 30 to a point that forms an X-degree angle with the sides of the tungsten electrode 30. The main handle body 40 is preferably also angled relative to the tangent of the angle grinder wheel 20 at the point where the tungsten electrode 30 is making contact with the angle grinder wheel 20. So, in FIG. 1, the tungsten electrode 30 is making contact with the angle grinder wheel 20 near a point X, the rotation of the angle grinder wheel 20 is indicated by the curved arrow Y, the curve traversed by the curved arrow Y has a tangent line Z (dashed line), and the tungsten electrode 30 has a central axis 32. The angle Θ between the central axis 32 of the tungsten electrode 30 and the tangent line Z is some non-zero, acute angle, such that the rotation of the angle grinder wheel 20 (in the counter-clockwise direction as illustrated) will impart rotation to the tungsten electrode 30 (as illustrated by the arrow 34) since the chuck 50 is mounted to the main handle body 40 by a radial bearing (not shown; but see FIGS. 2-3). Accordingly, the entire circumference of the tungsten electrode 30 will be ground to the same angle Θ.

Figure 2:
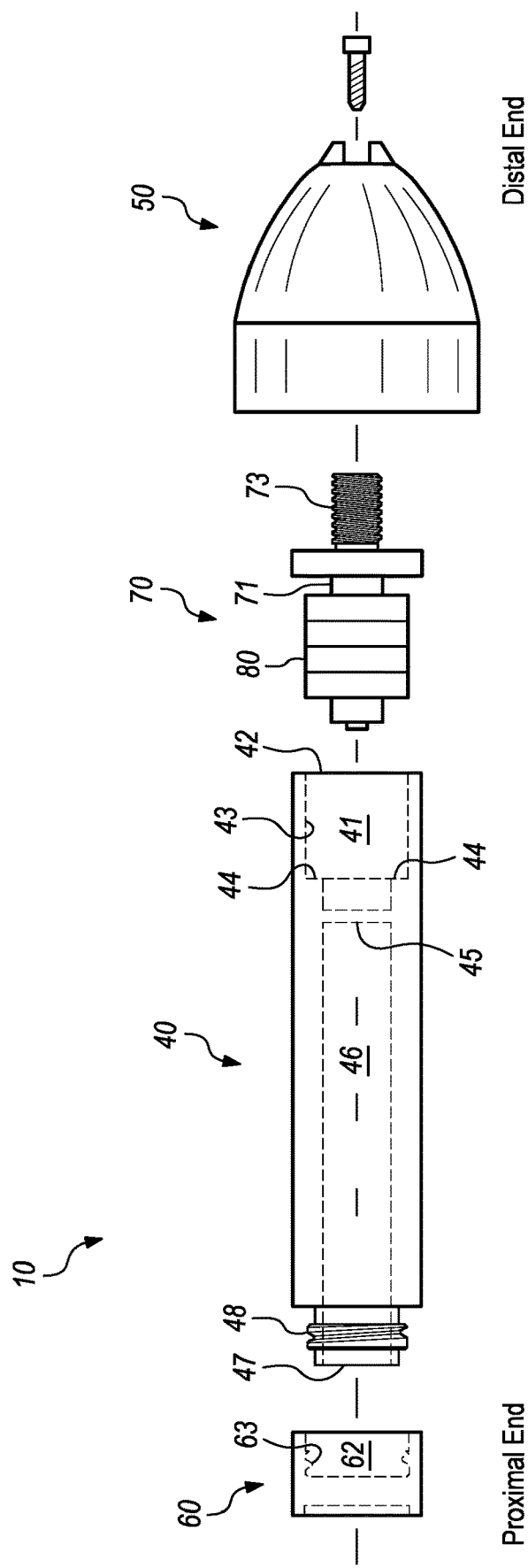
FIG. 2 is an assembly view of the tungsten sharpening tool.

FIG. 2 is an assembly view of the tool 10. Starting from the left side of the diagram, the tool 10 includes a cap 60 that forms a proximal end of the tool, a main handle body 40, a central shaft/bearing assembly 70 and the chuck 50. These components are to be assembled along an axial centerline to form the tool 10 as shown in FIG. 1. The main handle body 40 and the cap 60 may be referred to collectively as the "handle."

The main handle body 40 includes a first cylindrical cavity 41 that extends into the main handle body 40 from an opening 42 in the distal end of the main handle body and has a first cylindrical wall 43. The first cylindrical cavity 41 further includes an inwardly extending cylindrical shoulder 44 that is located a predetermined distance from the distal opening 42. A wall 45 separates the first cylindrical cavity 41 from a second cylindrical cavity 46 that extends into the main handle body 40 from an opening 47 in the proximal end of the main handle body 40. The proximal end of the main handle body 40 has external threads 48 adjacent the opening 47. The cap 60 has a recess or cavity 62 with internal threads 63 that mate with the external threads 48 to selectively close off the second cylindrical cavity 46.

The central shaft/bearing assembly 70 is to be secured inside the first cylindrical cavity 41 in a manner that allows the central shaft 71 to turn freely its axis. The relationships between the central shaft 71, the radial bearing(s) 80 and the first cylindrical cavity 41 is described in greater detail in reference to FIGS. 3A-C. However, the distal end of the central shaft 71 has external screw threads 73 for threadably coupling and securing the chuck 50. After securing the chuck 50 to the central shaft 71, the further screw 51 may be coupled into an internally thread hole in the distal end of the central shaft (shown in FIGS. 3A-C). The chuck preferably includes self-centering jaws for selectively gripping a tungsten electrode along an axis of rotation established by the central shaft/bearing assembly 70.

Figure 3A:
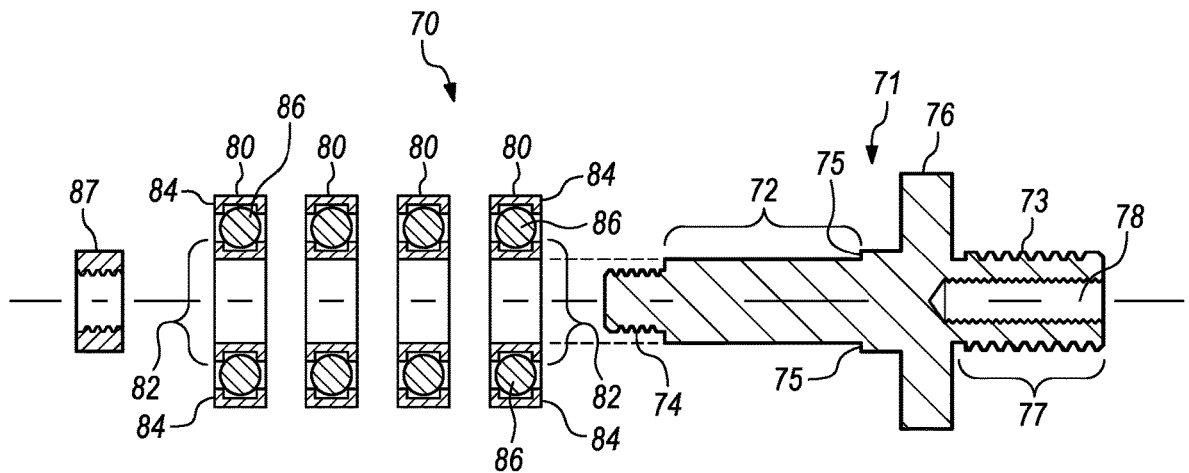
FIGS. 3A-C are cross-sectional side views of a bearing assembly that allows the chuck to rotate while a handle of the tungsten sharpening tool is held by a user.
Figure 3B:
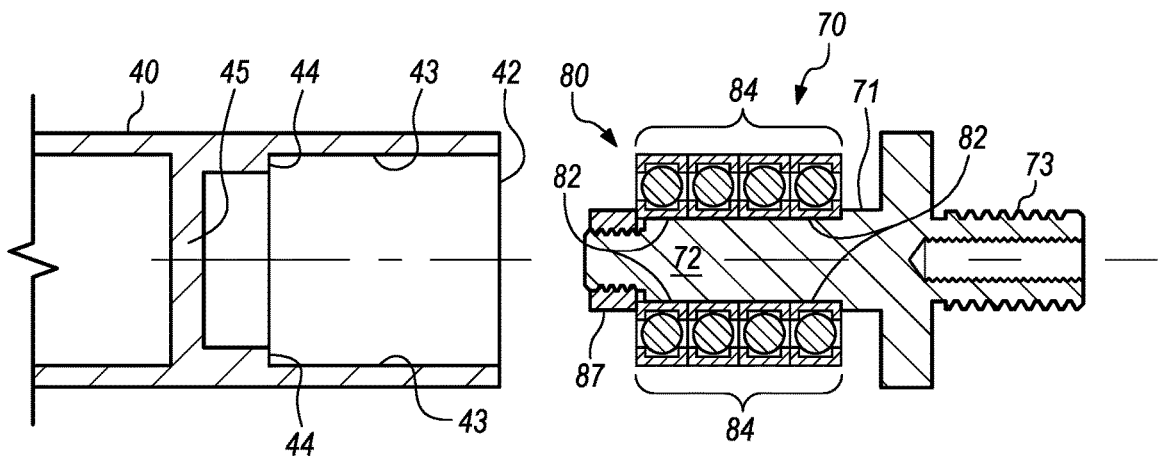
Figure 3C:
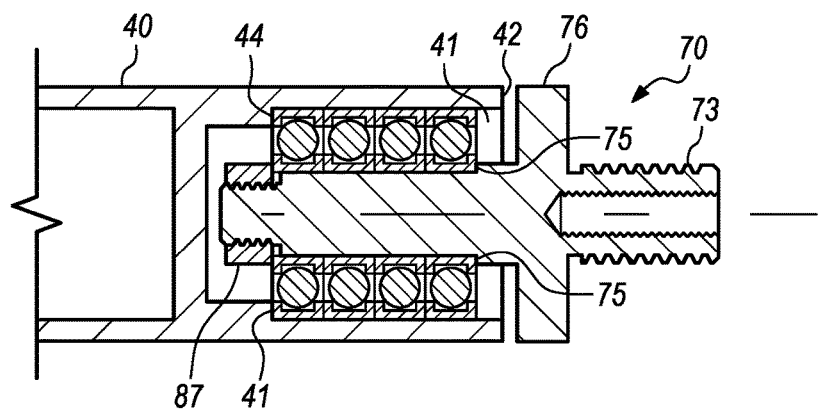

FIGS. 3A-C are cross-sectional side views of a central shaft/bearing assembly 70 that allows the chuck to rotate while a handle of the tool is held by a user. FIG. 3A shows a set of four radial bearings 80, each radial bearing 80 including an inner race 82, an outer race 84, and rolling elements 86 disposed between the inner and outer races. The inner race 82 defines an inner diameter opening that is received onto the central shaft 71.

The central shaft 71 includes a proximal section that forms a main cylindrical shaft 72 for receiving the radial bearing(s) 80. Once the radial bearing(s) 80 are in place, the radial bearing(s) 80 may be secured by attaching the threaded nut 87 to the threads 74 on the proximal end of the central shaft 71. The central shaft 71 further includes an outwardly extending cylindrical shoulder 75 that is located a predetermined distance from the proximal end of the central shaft. The outwardly extending cylindrical shoulder 75 registers the position of a distal end of the inner race 82. A collar 76 preferably has a diameter equal to that of the main handle body 40 (see FIG. 2) to protect the bearings from dirt and debris, and perhaps also be protect the user against a pinch point between the handle and the chuck. The distal section 77 extends from the first cylindrical cavity and includes the external screw threads 73. Optional internal screw threads 78 may also be provided to further secure the chuck to the central shaft 71.

FIG. 3B illustrates the central shaft/bearing assembly 70 ready to be inserted into the first cylindrical cavity 41. The first cylindrical cavity 41 has the first cylindrical wall 43 that receives the outer race 84 of the radial bearing(s) 80. Accordingly, the first cylindrical wall 43 may be only slightly larger in diameter than the radial bearing(s) 80. The first cylindrical cavity 41 further includes an inwardly extending cylindrical shoulder 44 that is located a predetermined distance from the distal opening 42 to register the position of a proximal end of the outer race 84.

The radial bearing(s) 80 are positioned about the main cylindrical shaft 72 with the inner race 82 pressed between the outwardly extending cylindrical shoulder 75 and the nut 87. Note that the outer race 84 is free to rotate relative to the central shaft 71. Before inserting the central shaft/bearing assembly 70 into the first cylindrical cavity 41, a thin layer of an adhesive material may be applied between an outer race 84 of the radial bearing 80 and the first cylindrical wall 43. The adhesive would then be allowed to set up prior to use, so that the adhesive will prevent the central shaft/bearing assembly 70 from coming out of the first cylindrical cavity 41 (see FIG. 3C).

FIG. 3C illustrates the central shaft/bearing assembly 70 secured within the first cylindrical cavity 41. Specifically, the outer races of the radial bearing(s) are engaged with the inwardly extending shoulder 44 and adhesively secured to the cylindrical wall 43. The inner races of the radial bearing (s) may be in frictional engagement with the inner race(s) of any adjacent radial bearing, the outwardly extending shoulder 75, and/or the threaded nut 87. However, there should be nothing that prevents the inner races of the radial bearings from turning freely relative to, and within, the outer races. In particular, note that the nut 87 and distal end of the main cylindrical shaft 72 do not engage the wall 45 and that the collar 76 does not engage the distal end of the main handle body 40.

Figure 4A:
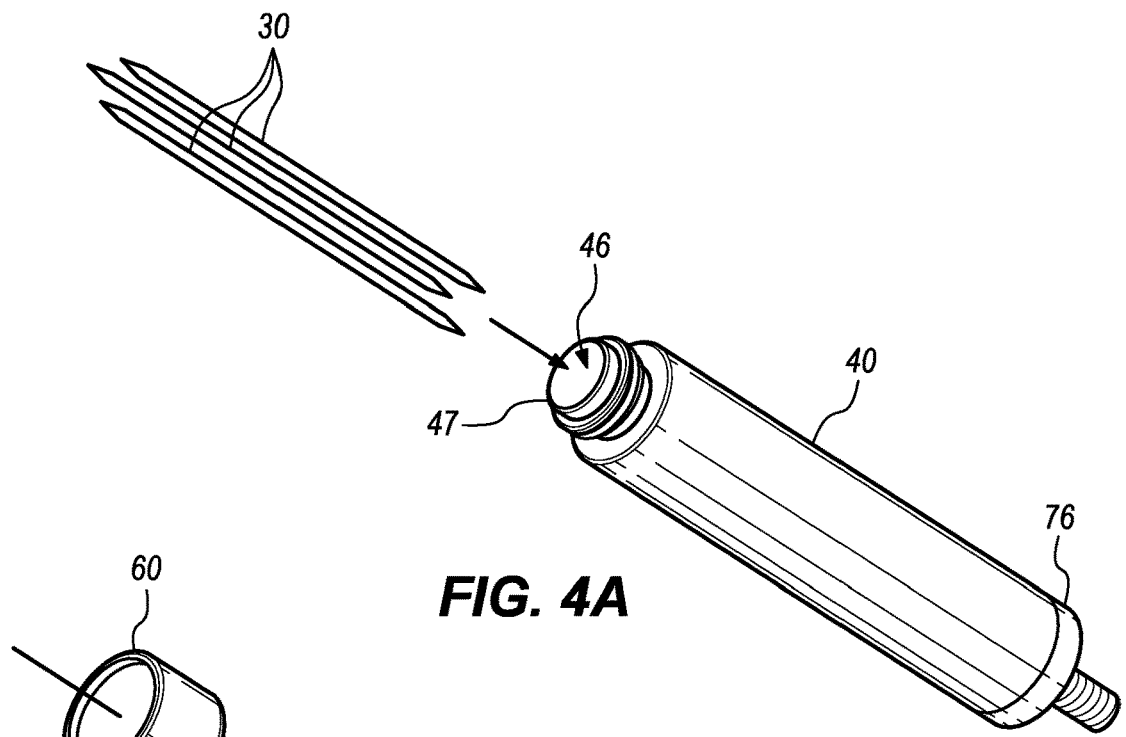
FIGS. 4A-C are perspective views of the handle with an internal storage compartment for storing additional tungsten electrodes.
Figure 4B:
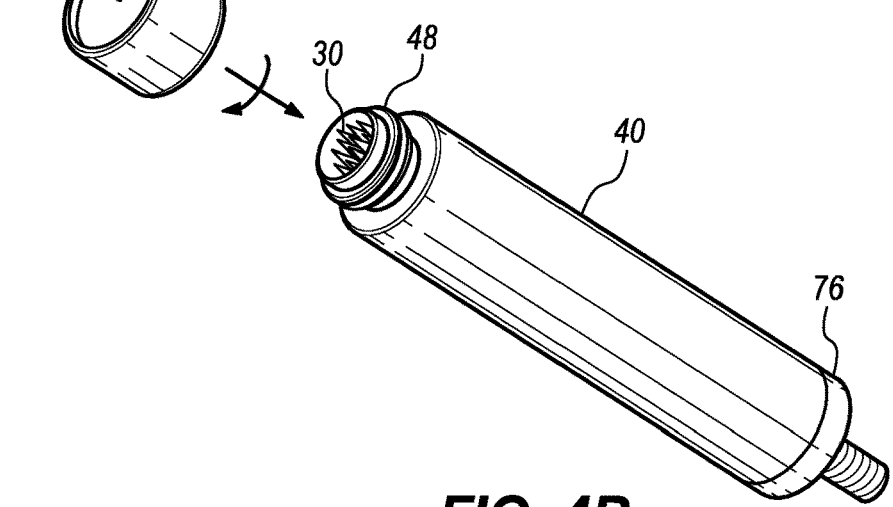
Figure 4C:
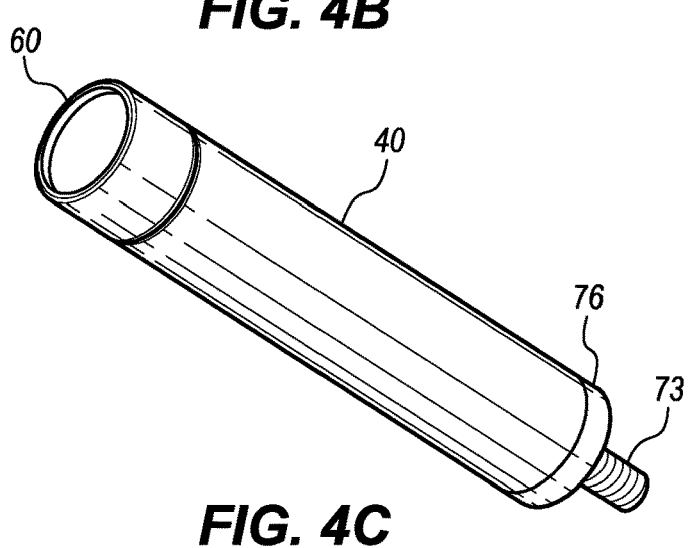

FIGS. 4A-C are perspective views of the main handle body 40 with an internal storage compartment formed in the second cylindrical cavity 46 for storing additional tungsten electrodes 30. In FIG. 4A, the main handle body 40 is shown with the second cylindrical cavity 46 extending into the main handle body 40 from an opening in the proximal end 47. A plurality of extra tungsten electrodes 30 are ready to be placed into the second cylindrical cavity 46 for storage until needed. In FIG. 4B, the tungsten electrodes 30 have been loaded into the second cylindrical cavity 46 and the cap 60 is aligned to be selectively secured to the threads 48 on the proximal end 47 of the main handle body 40 in order to close off the second cylindrical cavity and retain the extra tungsten electrodes during use or transport of the tool. Optionally, the second cylindrical cavity 46 may be at least 3.5 inches long from the internal wall 45 (see FIG. 2) to the inside of the cap 60 (see also FIG. 2) when the cap is secured to the proximal end of the main handle body. Depending upon the diameter of the main handle body 40 and the thickness of the wall around the second cylindrical cavity 46, the second cylindrical cavity may hold from 5 to 10 or more tungsten electrodes 30 having about a ⅛-inch diameter. In FIG. 4C, the cap 60 has been secured to the main handle body 40 such that the tungsten electrodes 30 are fully contained. When needed, one or more tungsten electrode 30 may be removed by removing the cap 60. However, neither the cap 60 nor the extra tungsten electrodes 30 interfere with the use of the tool 10 (see FIG. 1) for holding a tungsten electrode 30 during a sharpening operation.

The terminology used herein is for the purpose of describing particular embodiments only and is not intended to limit the scope of the claims. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, components and/or groups, but do not preclude the presence or addition of one or more other features, integers, steps, operations, elements, components, and/or groups thereof. The terms "preferably," "preferred," "prefer," "optionally," "may," and similar terms are used to indicate that an item, condition or step being referred to is an optional (not required) feature of the embodiment.

The corresponding structures, materials, acts, and equivalents of all means or steps plus function elements in the claims below are intended to include any structure, material, or act for performing the function in combination with other claimed elements as specifically claimed. Embodiments have been presented for purposes of illustration and description, but it is not intended to be exhaustive or limited to the embodiments in the form disclosed. Many modifications and variations will be apparent to those of ordinary skill in the art after reading this disclosure. The disclosed embodiments were chosen and described as non-limiting examples to enable others of ordinary skill in the art to understand these embodiments and other embodiments involving modifications suited to a particular implementation.

What is claimed is:

1. An apparatus, comprising:
    a rigid handle having a proximal end and a distal end, wherein the rigid handle includes a first cylindrical cavity extending into the rigid handle from an opening in the distal end and having a first cylindrical wall, wherein the first cylindrical cavity includes an inwardly extending cylindrical shoulder at a predetermined distance from the opening in the distal end to register the position of a proximal end of the outer race;
    a radial bearing having an inner race, an outer race, and rolling elements disposed between the inner and outer races, wherein the outer race is secured to the first cylindrical wall of the first cylindrical cavity;
    a central shaft having a proximal section and a distal section, wherein the proximal section is secured to the inner race, and wherein the distal section extends from the first cylindrical cavity and includes external screw threads, wherein the central shaft includes an outwardly extending cylindrical shoulder at a predetermined distance from a proximal end of the central shaft to register the position of a distal end of the inner race, wherein positioning the outer race against the inwardly extending cylindrical shoulder and the inner race against the outwardly extending cylindrical shoulder prevents the central shaft from contacting any portion of the rigid handle, and wherein a proximal end of the central shaft is externally threaded to threadably receive a threaded nut, wherein the threaded nut is tightened against a proximal end of the inner race and secures the distal end of the inner race against the outwardly extending cylindrical shoulder; and
    a chuck threadably coupled to the external screw threads included on the distal section of the central shaft, wherein the chuck includes self-centering jaws for selectively gripping a tungsten electrode along an axis of rotation established by the radial bearing.

2. The apparatus of claim 1, wherein the rigid handle includes a second cylindrical cavity extending into the rigid handle from an opening in the proximal end, and wherein an internal wall separates the first cylindrical cavity from the second cylindrical cavity, further comprising:
    a cap selectively securable to the proximal end to of the rigid handle.

3. The apparatus of claim 2, wherein the rigid handle is single, solid piece of aluminum.

4. The apparatus of claim 3, wherein the cap is a single solid piece of aluminum.

5. The apparatus of claim 4, wherein the proximal end of the rigid handle has first cylindrical threads and the cap includes second cylindrical thread for threadably coupling to the first cylindrical threads.

6. The apparatus of claim 5, wherein the second cylindrical cavity is at least 3.5 inches long from the internal wall to the inside of the cap when the cap is secured to the proximal end of the rigid handle.

7. The apparatus of claim 6, wherein the second cylindrical cavity will hold 10 tungsten electrodes having a ⅛-inch diameter.

8. The apparatus of claim 1, wherein the outer race of the radial bearing is secured to the first cylindrical wall by an adhesive.

9. The apparatus of claim 1, wherein a distal end of the distal section of the central shaft includes a threaded hole for receiving a screw to further secure the chuck to the central shaft.

10. An apparatus, comprising:
    a rigid handle having a proximal end and a distal end, wherein the rigid handle includes a first cylindrical cavity extending into the rigid handle from an opening in the distal end and having a first cylindrical wall, wherein the first cylindrical cavity includes an inwardly extending cylindrical shoulder at a predetermined distance from the opening in the distal end to register the position of a proximal end of the outer race;
    a radial bearing assembly including a plurality of radial bearings, each radial bearing having an inner race, an outer race, and rolling elements disposed between the inner and outer races, wherein the outer race of each of the radial bearings is secured to the first cylindrical wall of the first cylindrical cavity;
    a central shaft having a proximal section and a distal section, wherein the proximal section is secured to the inner race, and wherein the distal section extends from the first cylindrical cavity and includes external screw threads, wherein the central shaft includes an outwardly extending cylindrical shoulder at a predetermined distance from a proximal end of the central shaft to register the position of a distal end of the inner race of a most distal radial bearing in the plurality of radial bearings, wherein positioning the outer race of the most distal radial bearing against the inwardly extending cylindrical shoulder and the inner race of the most distal radial bearing against the outwardly extending cylindrical shoulder prevents the central shaft from contacting any portion of the rigid handle, and wherein a proximal end of the central shaft is externally threaded to threadably receive a threaded nut, wherein the threaded nut is tightened against a proximal end of the inner race of a most proximal radial bearing in the plurality of radial bearings and secures the distal end of the inner race of the most distal radial bearing against the outwardly extending cylindrical shoulder; and
    a chuck threadably coupled to the screw threads of the central shaft, wherein the chuck includes self-centering jaws for selectively gripping a tungsten electrode along an axis of rotation established by the radial bearing assembly.

11. The apparatus of claim 10, wherein the outer race of each of the radial bearings is secured to the first cylindrical wall by an adhesive.

12. The apparatus of claim 10, wherein the rigid handle includes a second cylindrical cavity extending into the rigid handle from an opening in the proximal end, and wherein an internal wall separates the first cylindrical cavity from the second cylindrical cavity, further comprising:
    a cap selectively secureable to the proximal end to of the rigid handle.

13. The apparatus of claim 12, wherein the rigid handle is single, solid piece of aluminum.

14. The apparatus of claim 13, wherein the cap is a single solid piece of aluminum.

15. The apparatus of claim 14, wherein the proximal end of the rigid handle has first cylindrical threads and the cap includes second cylindrical thread for threadably coupling to the first cylindrical threads.

16. The apparatus of claim 15, wherein the second cylindrical cavity is at least 3.5 inches long from the internal wall to the inside of the cap when the cap is secured to the proximal end of the rigid handle.

17. The apparatus of claim 16, wherein the second cylindrical cavity will hold 10 tungsten electrodes having a ⅛-inch diameter.

18. The apparatus of claim 10, wherein the outer race of the plurality of radial bearings is secured to the first cylindrical wall by an adhesive.

19. The apparatus of claim 10, wherein a distal end of the distal section of the central shaft includes a threaded hole for receiving a screw to further secure the chuck to the central shaft.

\* \* \* \* \*